US008239964B2

(12) United States Patent
Halcrow et al.

(10) Patent No.: US 8,239,964 B2
(45) Date of Patent: *Aug. 7, 2012

(54) ON-DEMAND PHYSICALLY SECURE DATA STORAGE

(75) Inventors: Michael A. Halcrow, Pflugerville, TX (US); Dustin Kirkland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 694 days.

This patent is subject to a terminal disclaimer.

(21) Appl. No.: 12/338,317

(22) Filed: Dec. 18, 2008

(65) Prior Publication Data

US 2009/0094701 A1 Apr. 9, 2009

Related U.S. Application Data

(63) Continuation of application No. 11/181,407, filed on Jul. 14, 2005, now Pat. No. 7,484,657.

(51) Int. Cl.
*G06F 7/04* (2006.01)
*G06F 17/30* (2006.01)
*H04N 7/16* (2006.01)

(52) U.S. Cl. .................. 726/27; 235/379; 235/375

(58) Field of Classification Search .............. 726/27; 235/379, 382, 375, 385, 383; 902/8–16
See application file for complete search history.

(56) References Cited

U.S. PATENT DOCUMENTS

| 6,839,843 | B1 | 1/2005 | Bacha et al. |
| 2004/0177658 | A1 | 9/2004 | Mitchell |

FOREIGN PATENT DOCUMENTS

| JP | 59053975 | A2 | 3/1984 |
| JP | 200145219 | A2 | 5/2000 |
| JP | 2003081407 | A2 | 3/2003 |
| WO | WO 01/65414 | A2 | 9/2001 |

OTHER PUBLICATIONS

Salahshour; Methodology for Multimedia Safe Deposit Box Work Area; Jun. 1993; pp. 91-91; v36, n6B; Dallas; US.
Salahshour; LAN Notification of Tampering; TDB; Sep. 1993; pp. 333-334; v36, n9A; Dallas; US.

*Primary Examiner* — Edwyn Labaze
(74) *Attorney, Agent, or Firm* — DeLizio Gilliam, PLLC

(57) ABSTRACT

Safe deposit boxes, services, and methods for physically secure data storage are provided that include securing a network-enabled computer within a safe deposit box, receiving, in the network-enabled computer, data transmitted from a remote computer coupled for data communications with the network-enabled computer; and storing the data in the memory of the network-enabled computer. Securing a network-enabled computer within a safe deposit box may be carried out by providing a locked safe deposit box having the networked enabled computer stored within. Securing a network-enabled computer within a safe deposit box may be carried out by providing a lockable safe deposit box having the networked enabled computer integrated within.

8 Claims, 7 Drawing Sheets

ON-DEMAND PHYSICALLY SECURE DATA STORAGE

CROSS-REFERENCE TO RELATED APPLICATION

This application is a continuation application if and claims priority from U.S. patent application Ser. No. 11/181,407, filed on Jul. 14, 2005.

BACKGROUND OF THE INVENTION

1. Field of the Invention

The field of the invention is data processing, or, more specifically, methods, systems, and products for physically secure data storage.

2. Description of Related Art

Safe deposit boxes have long been used for physically securing valuables. A safe deposit box (or safety deposit box) is a type of safe usually located in groups inside a vault in a bank, post office, or other physically secure location. A safe deposit box is useful for physically securing valuables such jewels, money, or important documents such as wills or property deeds. A safe deposit box provides physical security for these valuables from theft, fire, flood, and other calamities. In a typical arrangement, a user pays the service provider that maintains the security of the safe deposit box, such as a bank or post office, a fee for the use of the box, which can be opened only with production of the assigned key, the bank's master key, the proper signature, a code, a driver's license, or other required information or identification.

Some security minded users of data may store static digital media recorded on, for example USB key or a recordable compact disc, in a safe deposit box. Storing this static data in the safe deposit box, however, requires a user to travel to the safe deposit box and deposit within the safe deposit box the digital media containing the static data content. Traveling to the safe deposit box may be time consuming and cumbersome for a user. There is therefore an ongoing need for on-demand physically secure data storage.

SUMMARY OF THE INVENTION

Safe deposit boxes, services, and methods for physically secure data storage are provided that include securing a network-enabled computer within a safe deposit box, receiving, in the network-enabled computer, data transmitted from a remote computer coupled for data communications with the network-enabled computer; and storing the data in the memory of the network-enabled computer. Securing a network-enabled computer within a safe deposit box may be carried out by providing a locked safe deposit box having the networked enabled computer stored within. Securing a network-enabled computer within a safe deposit box may be carried out by providing a lockable safe deposit box having the networked enabled computer integrated within.

Receiving, in a network-enabled computer, data transmitted from a remote computer coupled for data communications with the network-enabled computer may include receiving encrypted data. Storing the data in the memory of the network-enabled computer may also include decrypting the received encrypted data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

On-Demand Physically Secure Data Storage

Figure 1:
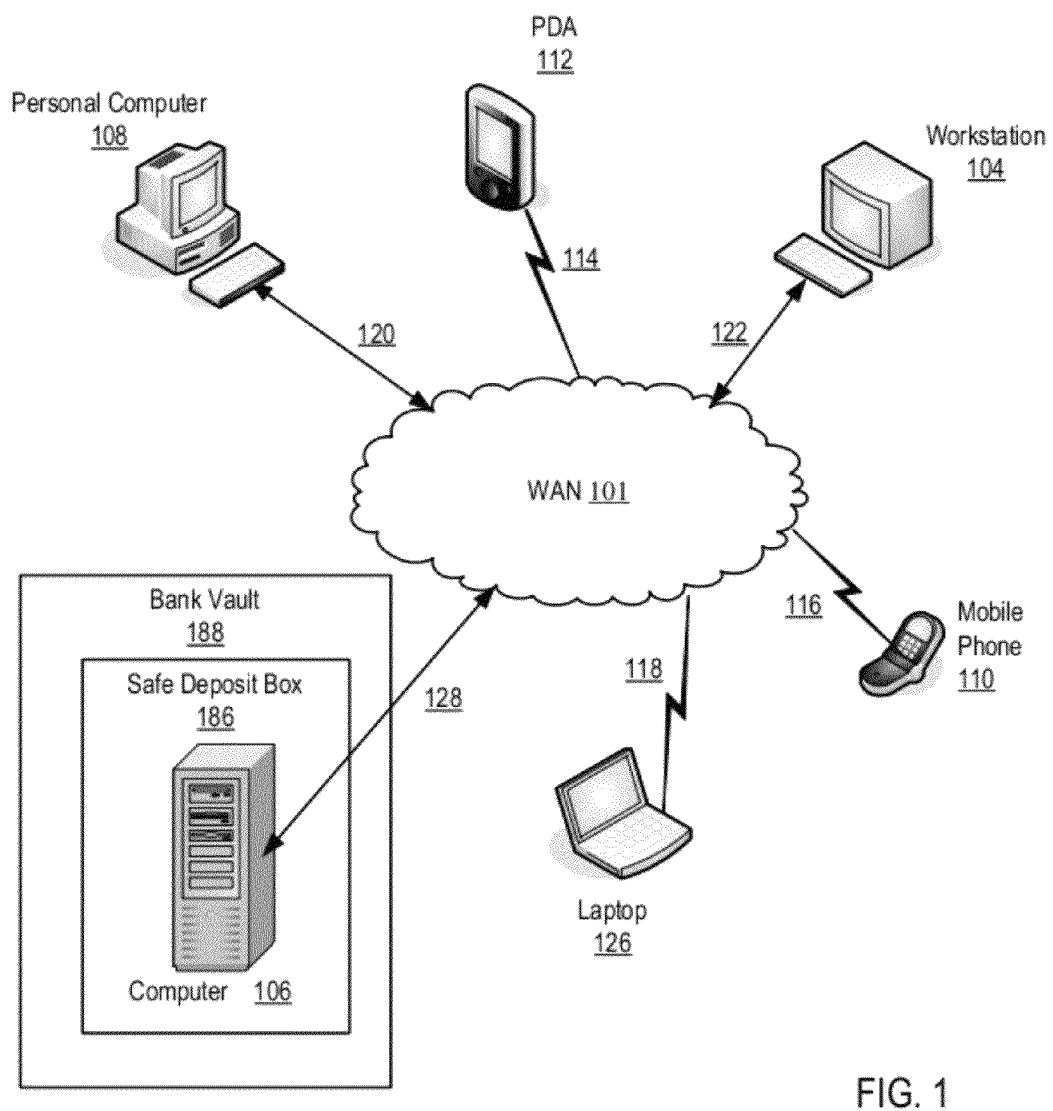
FIG. 1 sets forth a network diagram illustrating an exemplary system of computers useful in physically secure data storage according to embodiments of the present invention.

Exemplary methods, safe deposit boxes, and services for physically secure data storage according to embodiments of the present invention are described with reference to the accompanying drawings, beginning with FIG. 1. FIG. 1 sets forth a network diagram illustrating an exemplary system of computers useful in physically secure data storage according to embodiments of the present invention. The data processing system of FIG. 1 includes wide area network ("WAN") (101). The network connection aspect of the architecture of FIG. 1 is only for explanation, not for limitation. In fact, systems for physically secure data storage may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, several exemplary remote computers including personal computer (108), a PDA (112), a computer workstation (104), a mobile phone (110), and laptop (126) are connected to the WAN (101). Network-enabled mobile phone (110) connects to the WAN (101) through a wireless link (116), the laptop (126) connects to the WAN (101) through a wireless link (118), and the PDA (112) connects to the network (101) through a wireless link (114). In the example of FIG. 1, the personal computer (108) connects to the WAN (101) through a wireline connection (120) and the computer workstation (104) connects to the WAN (101) through a wireline connection (122).

Also connected to the WAN (101), in the example of FIG. 1, is a network enabled computer (106) secured within a safe deposit box (186). A safe deposit box is a physically secure box often leased to a user and maintained by a service provider such as a bank, post office, or other institution. The exemplary safe deposit box (186) of FIG. 1 is located within a bank vault (188) thereby providing secure physical storage of the computer (106).

The network enabled computer (106) secured within a safe deposit box (186) of FIG. 1 is capable generally of receiving transmitted from any of the remote computers (108, 112, 104, 110, 126) and storing the data in the memory of the network-enabled computer (106). The network enabled computer (106) secured within a safe deposit box (186) thereby advantageously provides physically secure storage of data available for transmission on-demand from any of the remote computers. The network enabled computer (106) secured within a safe deposit box (186) of FIG. 1 is also capable of wireline or wireless connectivity to the network.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Figure 2:
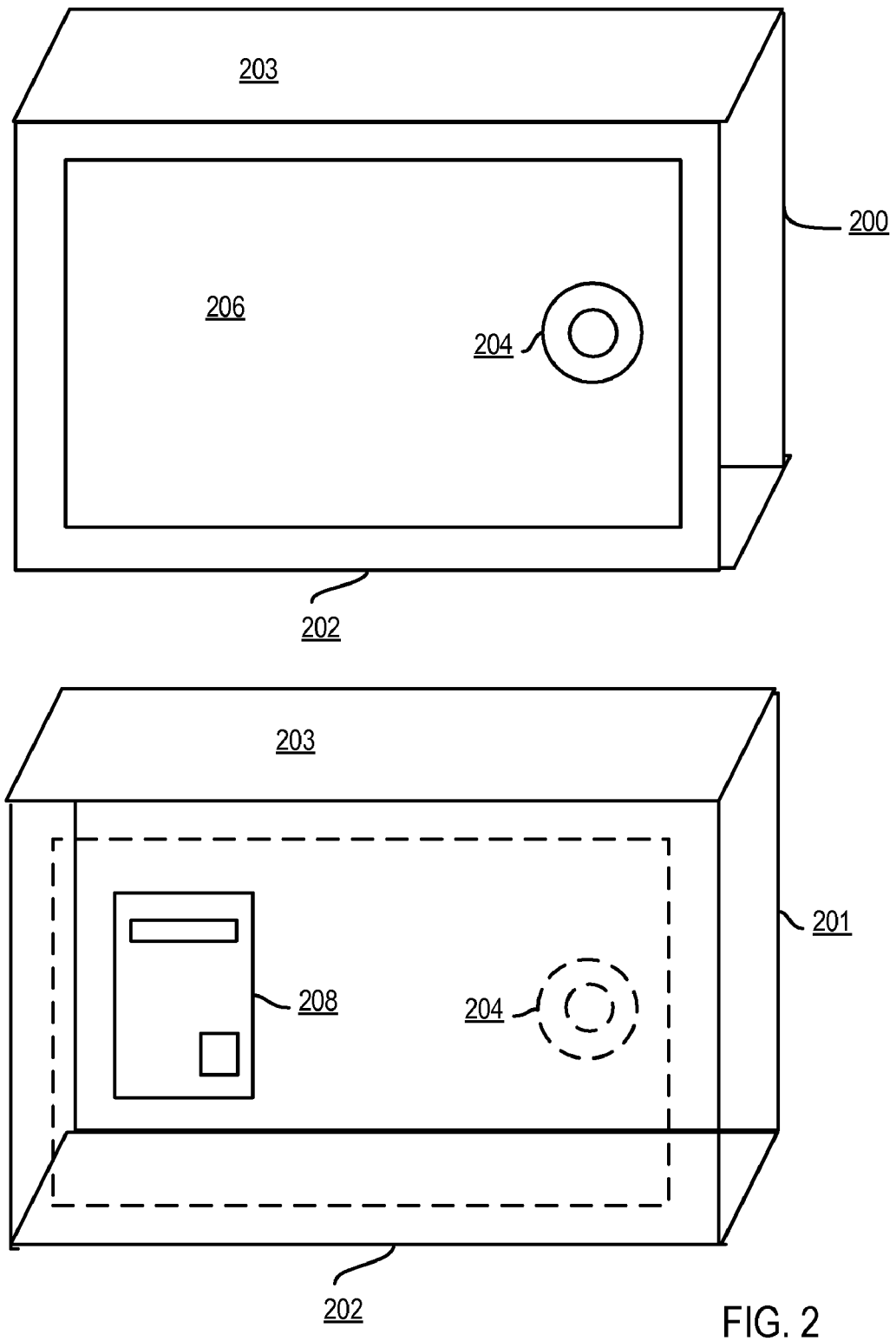
FIG. 2 sets forth a line drawing of a safe deposit box having a network enabled computer permanently integrated within the safe deposit box.

Computers (106) may be physically secured within safe deposit boxes according to the present invention by permanently integrating within a safe deposit box a network enabled computer, by providing safe deposit box capable of receiving within the safe deposit box a network enabled computer, or in other ways as will occur to those of skill in the art. For further explanation, FIG. 2 sets forth a line drawing of a safe deposit box having a network enabled computer permanently integrated within the shell of the safety deposit box. FIG. 2 sets forth a line drawing of a safety deposit box (202) with two views (200 and 201). The first view (200) illustrates the outside of the safety deposit box. The exemplary safety deposit box (202) includes a lockable shell (203) having a door (206) allowing access to the interior of the safe deposit box (202). The door (206) has a combination lock (204) for locking the door (206) of the lockable shell (203) of the safe deposit box (202). The combination a lock (204) of FIG. 2 is for illustration and not for limitation. In fact, many locks may be useful for securing a lockable shell of a safe deposit box. Such locks include pad locks, barrel locks, and others that will occur to those of skill in the art.

The second view (201) of the safe deposit box (202) of FIG. 2 provides a view of the interior of the safe deposit box (202). The safety deposit box (202) of FIG. 2 includes a network enabled computer (208) permanently integrated within the safe deposit box (202). The safe deposit box (202) provides physically secure data storage of data stored onto the network enabled computer (208) permanently integrated within. The safe deposit box of FIG. 2 advantageously provides an interior capable of traditional physical storage of physical valuables, as well as physically secure data storage on the network enabled computer (208).

Figure 3:
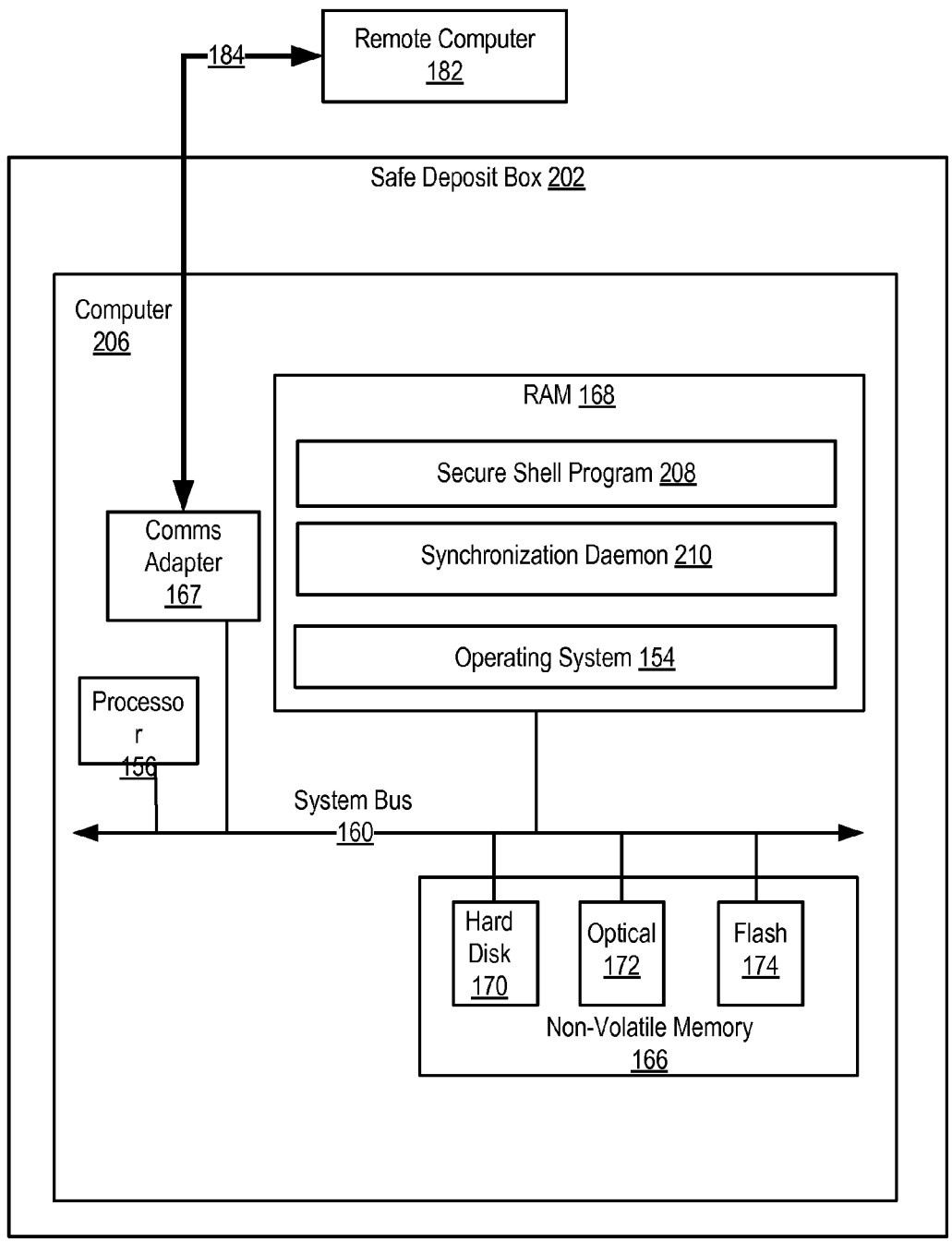
FIG. 3 sets forth a block diagram of the safe deposit box of FIG. 2 useful in physically secure data storage according to embodiments of the present invention.

For further explanation, FIG. 3 sets forth a block diagram of the safe deposit box (202) of FIG. 2 useful in physically secure data storage according to embodiments of the present invention. The safe deposit box (202) of FIG. 2 includes a permanently integrated network enabled computer (208). The computer (206) of FIG. 3 includes at least one computer processor (156) or 'CPU' as well as random access memory (168) ("RAM") which is connected through a system bus (160) to processor (156) and to other components of the computer.

Stored in RAM (168) is an operating system (154). Operating systems useful in computers according to embodiments of the present invention include UNIX™, Linux™, Microsoft Windows NT™, AIX™, IBM's i5/OS™, and others as will occur to those of skill in the art.

Also stored in RAM (168) is a secured data transfer program, in this example, a secure shell program ('SSH') (208). The SSH program includes computer instructions for securely receiving data for physically secure storage on the network enabled computer secured within the safe deposit box. SSH is a program capable of logging into another computer over a network, executing commands in a remote computer, and moving files from one computer to another across a network. SSH provides strong authentication and secure communications over insecure channels by tunneling data in encrypted sessions.

Also stored RAM (168) in the example of FIG. 3 is a synchronization daemon (210). The synchronization daemon (210) of FIG. 3 include computer program instructions that run in the background and at predefined times or in response to certain events. The synchronization daemon initiates a secure connection with a remote computer and initiates the transfer of data for physically secure storage on the network enabled computer. The term 'daemon' is typically term used in UNIX based systems. The term is used in this specification for explanation and not for limitation to mean a process that runs in the background and at predefined times or in response to certain events. In fact many operating systems provide support for daemons, though they are sometimes called other names. Windows, for example, refers to daemons as 'system agents' and 'services.'

The network enabled computer (206) secured within the safe deposit box of FIG. 3 includes non-volatile computer memory (166) coupled through a system bus (160) to processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art. The non-volatile memory of FIG. 3 may be permanently secured within the network enabled computer or be implemented as removable non-volatile memory allowing a user to conveniently physically remove the media on which data has be physically stored according to embodiments of the present invention.

For further network security of the data stored within the safe deposit box, the disk drives of the network enable computer of FIG. 3 may be configured to perform 'write only operations.' Strictly speaking, a disk drive cannot be totally write only because the disk drive must be able to read track and sector of the non-volatile memory to write data to that memory. A disk drive may be configured, however, to be 'write only' by configuring the disk drive to ignore all received read commands thereby effectively making the disk drive write-only. The write-only disk drive may alternatively be configured to return in response to all read instructions an error message or return in response to the read instruction data unrelated to the read instruction. Such data unrelated to the read instruction may include predetermined data to send in response to all read instructions or unrelated data created in real time in response to the read instruction. Such a write only drive within the network enabled computer secured within a safe deposit box reduces the network secure requirements for secure data storage.

For additional security, a disk drive may be augmented to require physical access to the computer to read from non-volatile memory. Such a disk drive may include for example a read enable switch accessible only with physical access to the computer. Such a read enable switch may be used to switch the disk drive from a 'normal read' state that provides normal read functions of the disk drive and a 'write only' state that, for example, ignores all received read commands, returns in response to all read instructions an error message, or returns in response to the read instruction data unrelated to the read instruction.

For additional security, the network enabled computer within a safe deposit box with a write only disk drive may also include removable non-volatile memory thereby allowing a user to periodically retrieve the non-volatile memory from the network enabled computer and then read the data from the memory using another computer that has not be configured to ignore read commands.

The exemplary network enabled computer (206) of FIG. 3 includes a communications adapter (167) for implementing data communications (184) with other remote computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for physically secure data storage according to embodiments of the present invention include modems for wired dial-up communications, Ethernet (IEEE 802.3) adapters for wired network communications, and 802.11b adapters for wireless network communications.

Figure 4:
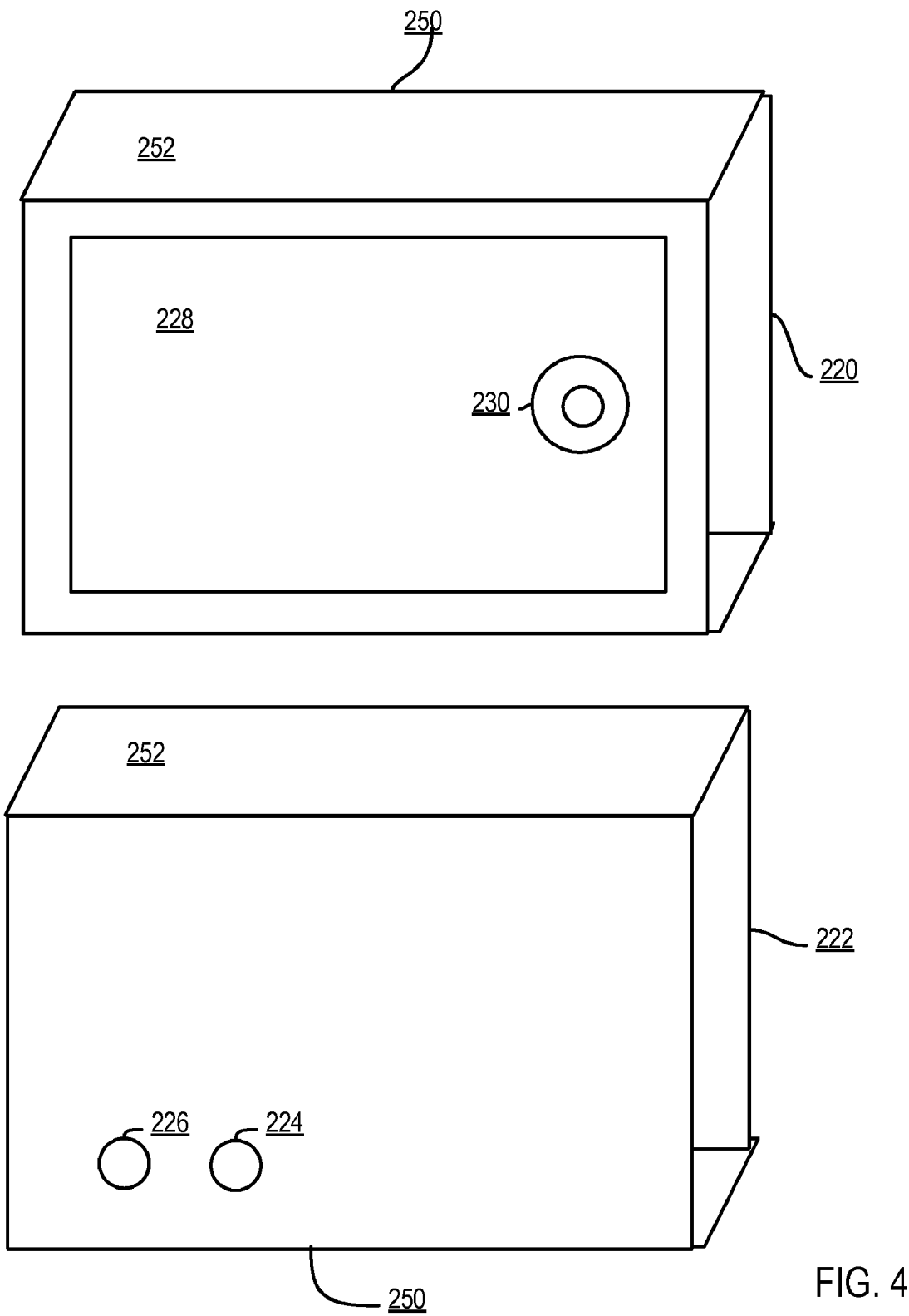
FIG. 4 sets forth a line drawing of a safe deposit box for data storage according to the present invention that does not include a permanently integrated network enabled computer.

The safe deposit boxes including a permanently integrated network enabled computer described with reference to FIGS. 2 and 3 are for explanation and not for limitation. In fact, safe deposit boxes useful in physically secure data storage according to embodiments of the present invention may be implemented in a number of ways. For further explanation therefore, FIG. 4 sets forth a line drawing of a safe deposit box for data storage according to the present invention that does not include a permanently integrated network enabled computer. The exemplary safe deposit box (250) of FIG. 4 is illustrated in two views (220 and 222). The first view (220) illustrating the front of the exemplary safe deposit box (250) includes a lockable shell (252) capable of receiving a network enabled computer. The lockable shell (252) capable of receiving a network enabled computer may be various shapes and sizes to accommodate various network enabled computers.

The lockable shell (252) of the safe deposit box (252) of FIG. 4 also includes a door (228) providing access to the interior of the safe deposit box (252). The door (228) of the lockable shell (252) includes a combination a lock (230) for securing the lockable shell. The combination a lock (230) of FIG. 4 is for illustration and not for limitation. In fact, many locks may be useful for securing a lockable shell of a safe deposit box. Such locks include pad locks, barrel locks, and others that will occur to those of skill in the art.

The second view (222) of FIG. 4 shows the exemplary safe deposit box (250) from the rear. The lockable shell (252) capable of receiving a network enabled computer within includes an aperture (226) for receiving a network cable within the lockable shell and an aperture (224) for receiving a power cable within the lockable shell. The aperture (226) for receiving a network cable within the lockable shell and the aperture (224) for receiving a power cable within the lockable shell may be sufficient sizes to provide network and power access to the computer stored within the safe deposit box.

Figure 5:
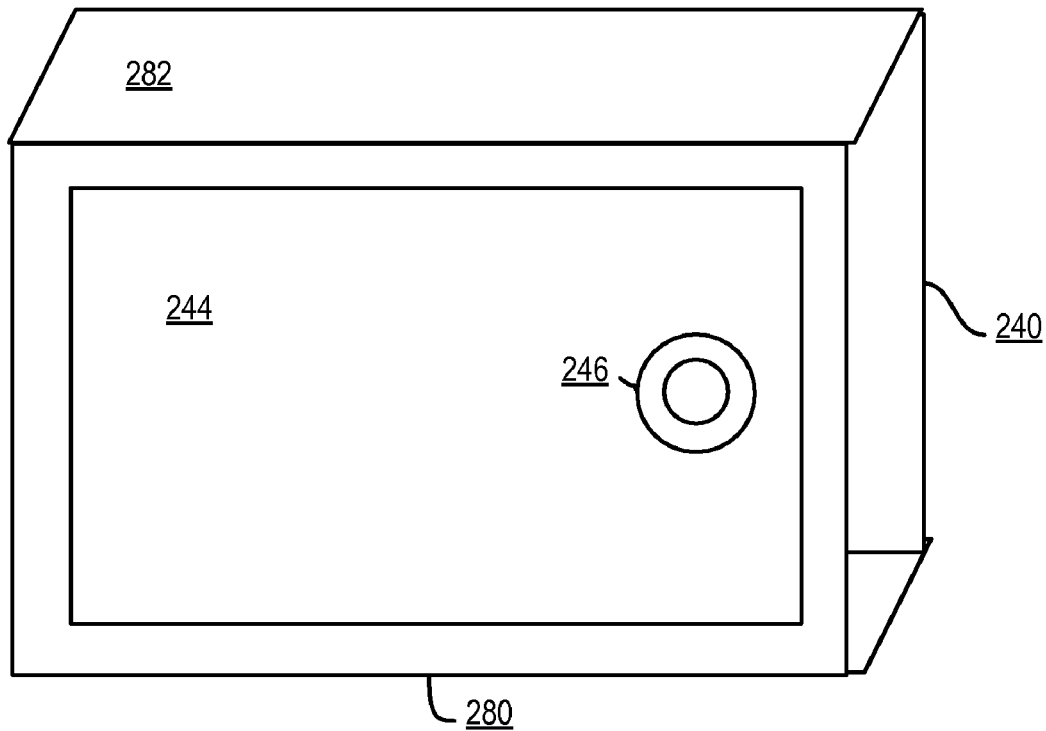
FIG. 5 sets forth a line drawing for an exemplary safe deposit box that provides network and power connectivity within the safe deposit box.
Figure 5:
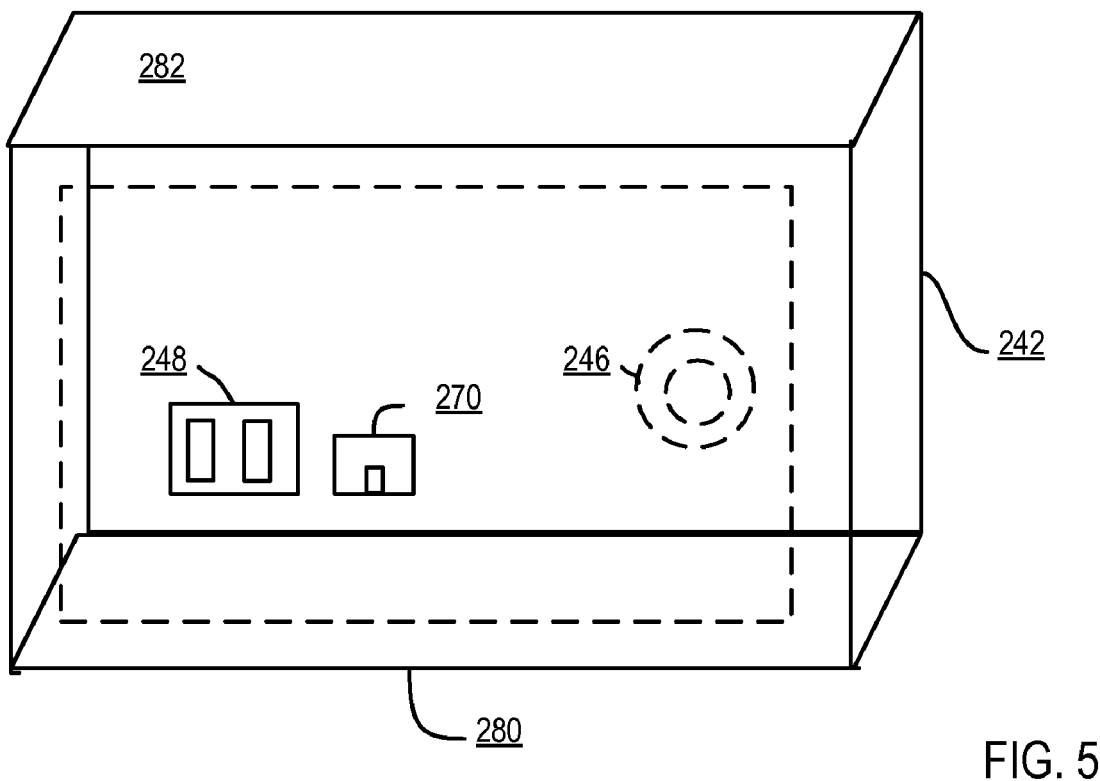

Providing apertures for receiving a network cable and power cables within the lockable shell may result in a service provider of safe deposit boxes having to provide many networks and power outlets outside the safe deposit box. This may be cumbersome. For further explanation, FIG. 5 sets forth a line drawing for an exemplary safe deposit box that provides network and power connectivity within the safe deposit box. The exemplary safe deposit box (280) of FIG. 5 is illustrated in two views (240 and 242). The first view (240) illustrating the front of the exemplary safe deposit box (280) includes a lockable shell (282) capable of receiving a network enabled computer. The lockable shell (282) capable of receiving a network enabled computer may be various shapes and sizes to accommodate various network enabled computers.

The lockable shell (282) of the safe deposit box (280) of FIG. 5 also includes a door (244) providing access to the interior of the safe deposit box (280). The door (244) of the lockable shell (282) includes a combination a lock (246) for securing the lockable shell. The combination a lock (246) of FIG. 5 is for illustration and not for limitation. In fact, many locks may be useful in securing a lockable shell of a safe deposit box. Such locks include pad locks, barrel locks, and others that will occur to those of skill in the art.

The second view (242) of FIG. 5 shows the exemplary safe deposit box (280) from the interior. The lockable shell (282) capable of receiving a network enabled computer within includes a power outlet (248) for receiving a power plug of the power cable of the network enabled computer secured with the safe deposit box. The lockable shell (282) capable of receiving a network enabled computer within also includes a network port (270) for receiving a network cable to provide network connectivity to the computer secured with the safe deposit box.

The exemplary safe deposit boxes described with reference to FIGS. 2-5 illustrate some exemplary ways in which safe deposit boxes for physically secure data storage according to embodiments of the present invention may be implemented. The exemplary safe deposit boxes are for illustration and not for limitation. Safe deposit boxes according to embodiments of the present invention may be implemented in many ways in accordance with the scope of the present invention.

Figure 6:
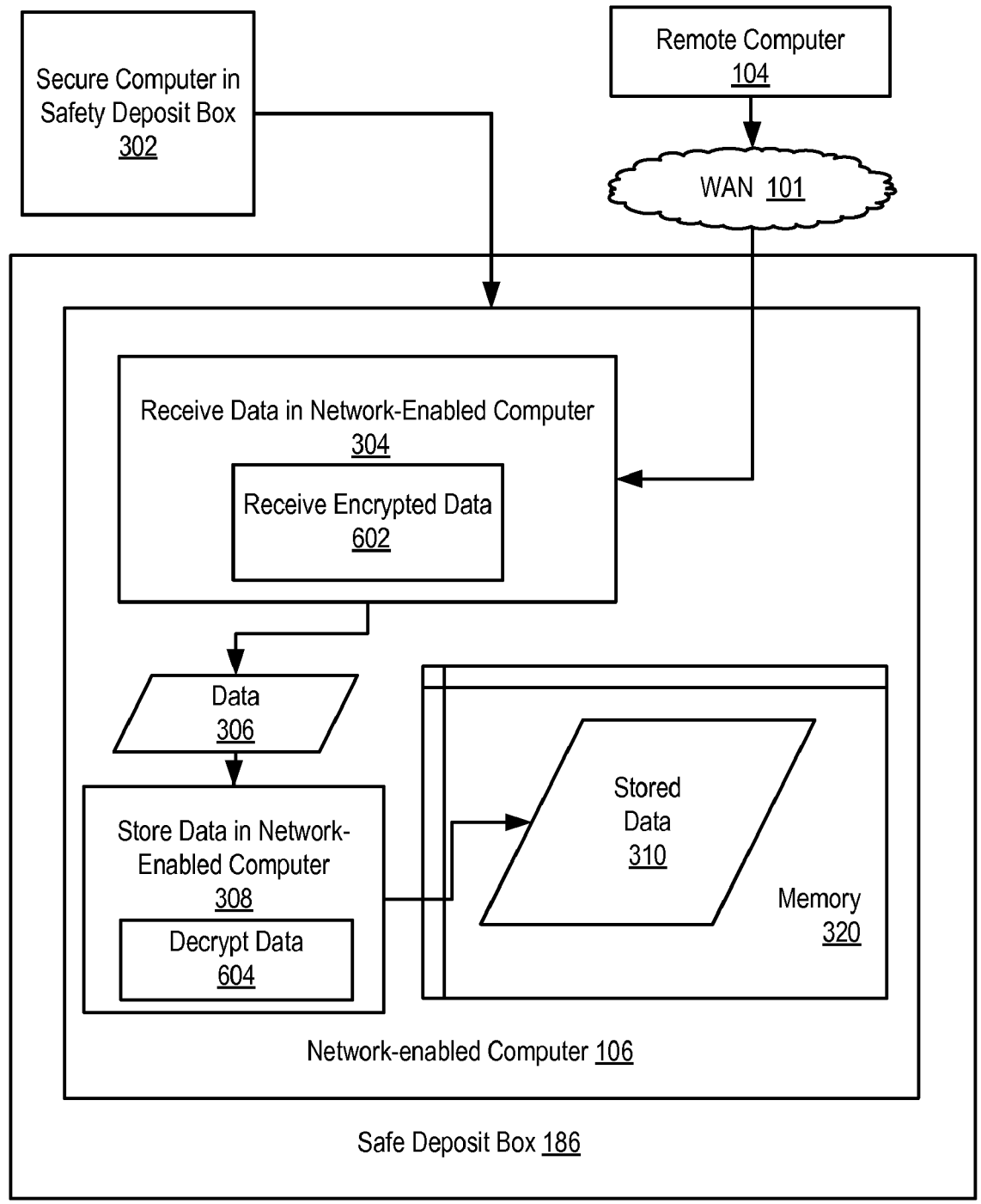
FIG. 6 sets forth a flow chart illustrating an exemplary method for physically secure data storage according to embodiments of the present invention.

For further explanation, FIG. 6 sets forth a flow chart illustrating an exemplary method for physically secure data storage according to embodiments of the present invention. The method of FIG. 6 includes securing (302) a network-enabled computer (106) within a safe deposit box (186). Securing (302) a network-enabled computer (106) within a safe deposit box (186) may be carried out by providing a lockable safe deposit box having the networked enabled computer stored within. Such safe deposit boxes may have a lockable shell, such as the exemplary lockable shells described above, capable of receiving a network enabled computer and a lock for securing the lockable shell.

Securing (302) a network-enabled computer (106) within a safe deposit box (186) may also be carried out by providing a lockable safe deposit box having the networked enabled computer integrated within. Securing (302) a network-enabled computer (106) within a safe deposit box (186) provides a user with a traditional safe deposit box for physical storage of important possessions, as well as physically secure data storage according to embodiments of the present invention.

The method of FIG. 6 also includes receiving (304), in the network-enabled computer (106), data (306) transmitted from a remote computer (104) coupled for data communications with the network-enabled computer (106). Receiving (304) data (306) transmitted from a remote computer (104) coupled for data communications with the network-enabled computer (106) may be initiated periodically by a synchronization daemon that runs in the background and periodically initiates a connection with a remote computer (104) and initiates the transfer of data to the network enabled computer (106) secured within the safe deposit box (186).

As discussed above, for network security often data received by the network enabled computer is transmitted in encrypted form. Receiving (304) data (306) transmitted from a remote computer (104) coupled for data communications with the network-enabled computer (106) according to the method of FIG. 6 therefore includes receiving (602) encrypted data. As discussed above, a secured data transfer program, such as for example, a secure shell program ('SSH') may be installed on the network enabled computer (106) that is capable of authenticating a remote computer (104), logging into the remote computer (104) over a network, and tunneling data to the network enabled computer in an encrypted session.

The method of FIG. 6 also includes storing (308) the data (306) in the memory (320) of the network-enabled computer (106). In the example of FIG. 6, storing (308) the data (306) in the memory (320) of the network-enabled computer (106) includes decrypting (604) the received encrypted data and storing the data in unencrypted form in memory (320) of the network enabled computer (106).

For further security, storing (308) the data (306) in the memory (320) of the network-enabled computer (324) may include writing the data to removable non-volatile memory. Removable non-volatile memory allows a user to retrieve the data stored (310) in the network enabled computer without leaving a copy of the data in the network enabled computer.

As discussed above, for further network security, network enabled computers secured within a safe deposit box may be implemented with write only disk drives. As discussed above, a disk drive must be able to read track and sector of the non-volatile memory to write data to that memory. A disk drive may be configured to be 'write only,' however, by configuring the disk drive to ignore all received read commands thereby effectively making the disk drive write-only, or to return an error message or data unrelated to the read instruction in response to all read commands.

Conventional safe deposit boxes are currently available through various service providers, such as, for example, banks, post offices, and other institutions. Safe deposit boxes according to embodiments of the present invention may also advantageously be provided by service providers. For further explanation therefore, FIG. 7 sets forth a flow chart illustrating an exemplary service for secure data storage that may be carried out by a service provider. The method of FIG. 7 includes providing (710) for lease a physically secure safe deposit box (702) having stored within the safe deposit box a network enabled computer. As discussed above, providing (710) for lease a physically secure safe deposit box (702) having stored within the safe deposit box a network enabled computer may be carried out, for example, by a service provider who provides for lease a physically secure safe deposit box capable of receiving with it a network enabled computer or a safe deposit box having an integrated network enabled computer.

Figure 7:
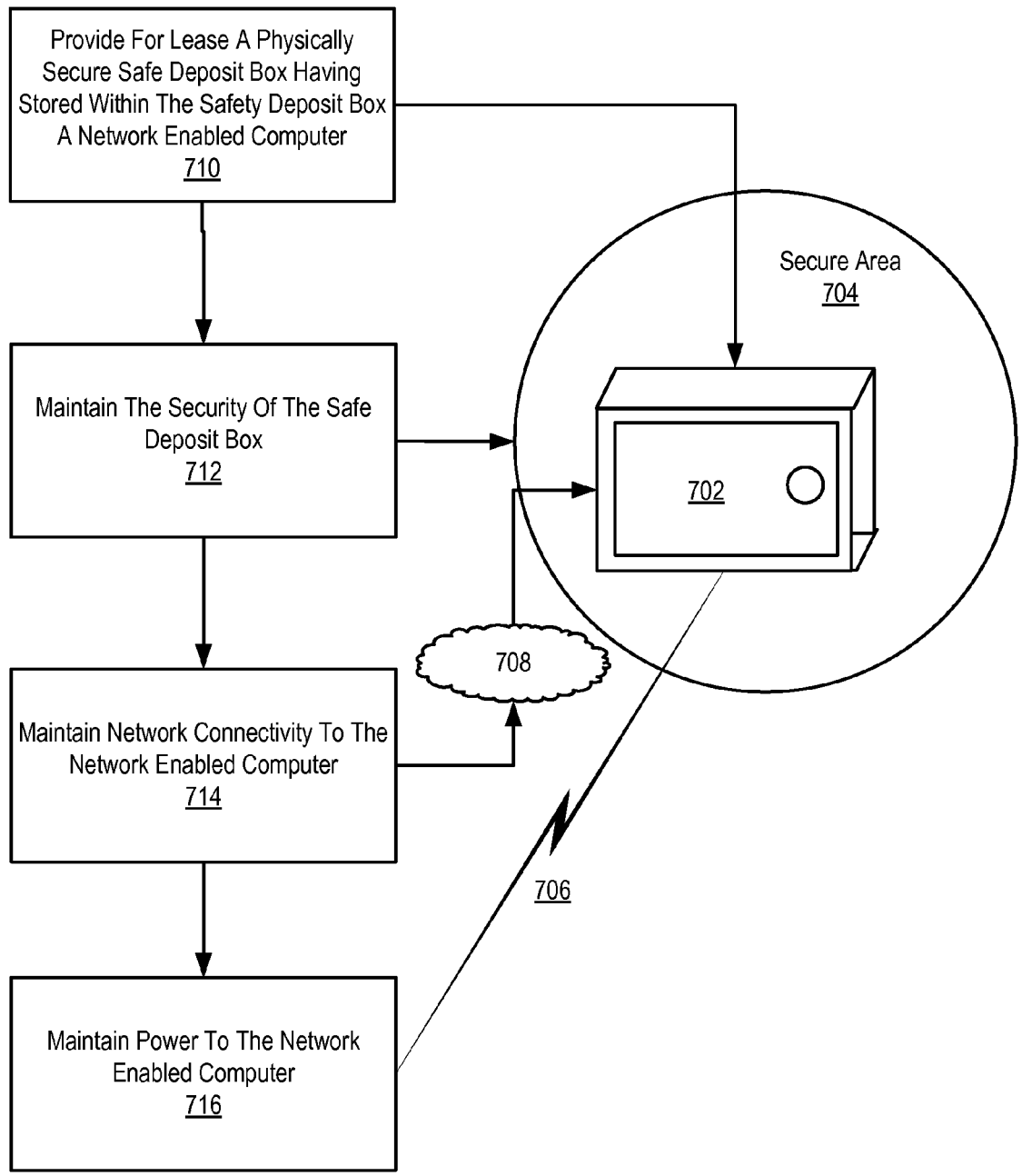
FIG. 7 sets forth a flow chart illustrating an exemplary service for secure data storage according to embodiments of the present invention.

The method of FIG. 7 includes maintaining (712) the security of the safe deposit box (702) in a secure area (704). Maintaining (712) the security of the safe deposit box (702) may be carried out by securing the safe deposit box within a vault or other physical fortification. Maintaining the security of the safe deposit box may also include human security guards, video surveillance equipment, and other security measures to maintain the security of the safe deposit box as will occur to those of skill in the art.

The method of FIG. 7 also includes maintaining (714) network connectivity (708) to the network enabled computer within the safe deposit box (702). Maintaining (714) network connectivity (708) to the network enabled computer within the safe deposit box (702) may include monitoring network connectivity and providing connectivity fail-over. Maintaining (714) network connectivity (708) to the network enabled computer within the safe deposit box (702) may be carried out by the service provider or outsourced to a third party who specializes in network maintenance.

The method of FIG. 7 also includes maintaining (716) power (706) to the network enabled computer within the safe deposit box (702). Maintaining (716) power (706) to the network enabled computer within the safe deposit box (702) may include providing back up power generators for power fail-over protection of the network enabled computers. Maintaining (716) power (706) to the network enabled computer within the safe deposit box (702) may be carried out by the service provider or outsourced to a third party who specializes in power maintenance.

Exemplary embodiments of the present invention are described largely in the context of a fully functional computer system for physically secure data storage. Readers of skill in the art will recognize, however, that aspects of the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for physically secure data storage in a network-enabled computer that is physically secured within a lockable safe deposit box, the method comprising:

receiving, in the network-enabled computer that is physically secured within the lockable safe deposit box, encrypted data transmitted from a remote computer coupled for data communications with the network-enabled computer;

decrypting the received encrypted data;

storing the decrypted data in non-volatile memory of the network-enabled computer; and preventing remotely initiated reading of the decrypted data stored in the network-enabled computer.

2. The method of claim 1 further comprising:

returning an error message in response to the remotely initiated reading.

3. The method of claim 1, wherein said preventing the remotely initiated reading of the decrypted data stored in the network-enabled computer comprises:

ignoring the remotely initiated reading.

4. The method of claim 1 further comprising initiating a secure data transfer from the remote computer by a background process executing on the network-enabled computer, wherein said receiving the encrypted data from the remove computer is responsive to said initiating the secure data transfer.

5. A safe deposit box for data storage; the safe deposit box comprising:

a lockable shell having a first aperture adapted to receive a network cable and a second aperture for receiving a power cable within the lockable shell, a network port adapted for network connectivity for a network enabled computer within the lockable shell, a power outlet adapted for power connectivity for the network enabled computer within the lockable shell;

the network enabled computer integrated within the lockable shell, the network enabled computer having one or more non-volatile computer memories and the network-enabled computer adapted to prevent remote reading of data stored in the one or more non-volatile computer memories; and a lock for securing the lockable shell.

6. The safe deposit box of claim 5 wherein a first of the non-volatile computer memories has disposed within it a synchronization engine.

7. The safe deposit box of claim 5 wherein a first of the non-volatile computer memories has disposed within it a secure data transfer program.

8. The safe deposit box of claim 5, wherein the network enabled computer comprises a switch to enable and disable reading of data stored in the network-enabled computer.

* * * * *